Patented Jan. 17, 1950

2,494,847

UNITED STATES PATENT OFFICE 2,494,847

SAFETY CONTROL FOR WELDERS

Jerome B. Welch, Wauwatosa, Wis., assignor to Cutler-Hammer, Inc., Milwaukee, Wis., a corporation of Delaware Application April 21, 1948, Serial No. 22,477

11 Claims. (Cl. 219—4)

This invention relates to powered welders and safety control therefor.

The safety control herein disclosed is in certain respects similar to that disclosed in the Carlyle Patent No. 2,400,486, issued May 21, 1946, and is an improvement.

An object of the invention is to provide for such welders control sensitive to obstruction between the movable electrode and the work and responsive to move the movable electrode away from the work when an obstruction is encountered, while permitting normal operation of the welder under normal conditions.

Another object is to incorporate the safety means at least in part in a carrier for the movable electrode.

Another object is to provide an electrode carrier which through relative movement of parts thereof controls electrical connection of its electrode in such a manner that the electrical connection of the electrode is normally interrupted but is completed immediately following contact of the electrode with the work.

Another object is to provide safety means of the aforesaid character which is controllable by relative movement of the aforementioned parts of the electrode carrier to be operative for safety action until the movable electrode closely approaches the work and then to be inoperative for safety action, and Another object is to provide for utilization in both safety control and control of the electrical connection of the electrode, a single switch operable by relative movement of said relatively movable parts of the electrode carrier.

Other objects and advantages of the invention will hereinafter appear.

The accompanying drawings illustrate certain preferred embodiments of the invention, which will now be described, it being understood that the embodiments are susceptible of various modifications without departing from the scope of the appended claims.

Figure 1:
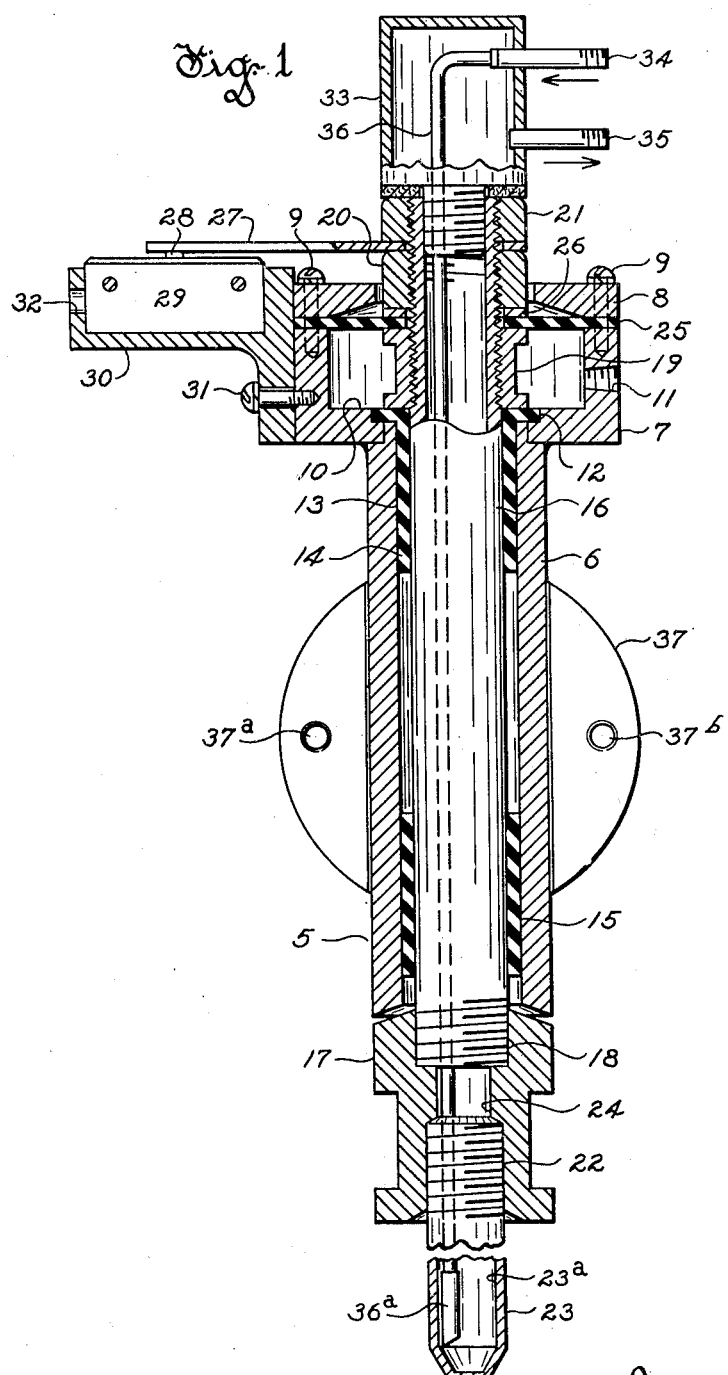
Figure 1 is a view in vertical cross section of an electrode carrier.

Referring to Fig. 1, it shows a preferred form of electrode carrier 5 to be used for the mounting of a movable welding electrode in known types of welders. As will hereinafter be more fully explained, carrier 5 provides in conjunction with certain other control elements during the normal operating cycle of such welders, for electrical connection of its electrode and also initiates a safety control function when an obstruction is encountered between its electrode and the work as the electrode is moved toward the work.

More particularly, as shown in Fig. 1, carrier 5 is provided with a housing comprising a cylindrical tube or shell 6, an open ended cylindrical cup-like member 7 which is rigidly connected to shell 6 as by fusion welding, and a cover member 8 which is secured to member 7 as by a plurality of screws 9. Shell 6 is preferably formed of a copper base alloy to insure relatively high electrical conductivity of the same. Member 7 is provided with an end portion to which the shell 6 is connected, and is provided with a recess 10 which communicates with the bore of the shell 6 through a passage formed through said end portion. Member 7 is also provided with a threaded opening 11 through the cylindrical wall thereof, which opening is preferably tapered to permit attachment of standard pipe or conduit couplings thereto. A shallow recess is preferably formed in the inside of the closed end of member 7 about the passage therethrough communicating with the bore of shell 6; said recess being adapted to accommodate the enlarged end portion 12 of a bushing 13. Bushing 13 is also provided with a tubular portion 14 which engages about its outer surface with a portion of the inner wall of shell 6 in a tightly fitting relation.

A bushing 15, which is preferably of the same dimensions and form as the portion 14 of the bushing 13, is inserted within the bore of shell 6 and tightly engages about its outer surface with the inner wall of the shell in a spaced relation to the bushing 13. Bushings 13 and 15 are formed of an electrical insulating material, such as for example, a composition comprising textile laminations impregnated with a phenolic molding compound to insure relatively high mechanical strength.

A tubular shaft 16, preferably formed of a stainless type steel, has sliding engagement, with a fairly close fit, with the inner surfaces of the bushings 13 and 15; the latter providing for spacing of said shaft with respect to the wall of shell 6 and electrically insulating the shaft from said shell. Shaft 16 extends at one end through and beyond cover member 8, which is provided with a central clearance opening therethrough, and at its opposite end extends beyond the lower end of the shell 6. At its lower end, shaft 16 is suitably threaded for attachment to an electrode holder 17, being threaded into a threaded recess 18 formed in the latter. At its opposite end shaft 16 is suitably threaded along a portion adjacent said end to provide for securement thereto of a spacer 19, and nuts 20 and 21. Electrode holder 17 is provided with a threaded recess 22 in its opposite end to accommodate a known type of welding electrode 23. Recesses 18 and 22 of holder 17 interconnect through a central passage 24 formed in said holder.

Spacer 19, normally abuts the portion 12 of bushing 13 and thereby limits movement of shaft 16 in one direction with respect to the shell 6; shaft 16 being normally biased to such limit as by gravity in the position of carrier 5 shown. A flexible diaphragm 25 of circular form, and having a central clearance opening for the shaft 16 is clamped in a fluid tight relation about the latter by the assembly comprising the spacer 19, a washer 26 and the nut 20. Preferably, diaphragm 25 is formed from a sheet of rubber impregnated textile material, and is provided with a series of marginal openings to register with screw receiving openings formed in cover member 8. Diaphragm 25 is secured about its outer circumference between the end of the cylindrical wall of member 7 and the cover member 8, the latter being tightly secured to member 7 by the screws 9 which penetrate the openings in the diaphragm and take into threaded recess or inserts in the end of the cylindrical wall of member 7. As shown, the inner portion of cover member 8 overlying diaphragm 25 is preferably concaved to provide a chamber to accommodate diaphragm 25 upon upward movement of the latter.

The recess 10 of member 7 and diaphragm 25 provide a closed fluid diaphragm chamber. When air or other fluid is admitted to the chamber under sufficient pressure, the shaft 16 moves upwardly with respect to the housing. Such upward movement of shaft 16 is limited by abutting engagement of a frusto-conical surface formed on the electrode holder 17 with a corresponding surface formed on the adjacent end of shell 6.

An arm 27 provided with a clearance opening adjacent one end thereof to accommodate the shaft 16 is rigidly clamped about the latter between the nuts 20 and 21, and projects perpendicularly of shaft 16 so as to over-lie adjacent the free end thereof, an actuator 28 of an electric switch 29. In the normal condition of electrode carrier 5 as shown, arm 27 is adapted to restrain actuator 28 inwardly of switch 29 against inherent bias of the latter. When shaft 16 moves upwardly within said housing, arm 27 moves upwardly therewith so as to permit actuator 28 to move outwardly with respect to switch 29 whereby the latter assumes its normal condition.

Switch 29 is preferably mounted in an open recess or well of a bracket 30 which is attached to the cylindrical side wall of member 7 in a rigid manner by a plurality of screws 31. Bracket 30 is preferably provided with an opening 32 extending through a side wall thereof to facilitate the making of electrical connections with switch 29.

As will be later more fully explained, the operation of switch 29 to its normal condition as a result of upward movement of shaft 16 affords certain control functions in a preferred type of control system for a welder.

Shaft 16 is preferably provided with internal threads adjacent the upper end thereof for fluid-tight attachment of a casing 33, having side wall inlet and outlet conduits 34 and 35, respectively, to shaft 16. Preferably, a coolant conducting tube 36 of relatively small diameter is connected internally at one end with the interior of inlet conduit 34 and said tube projects through shaft 16, electrode holder 17 and into an interior recess 23ᵃ formed in the electrode 23. Preferably tube 36 is provided with an end section 36ᵃ of a size to slide or telescope over tube 36 thereby providing for extension of the lower end of the latter according to depth of the recess formed in a particular electrode used. Coolant which has absorbed heat from the electrode will flow upwardly through holder 17, shaft 16 and out through the outlet conduit 35 of casing 33.

As shown, a preferred type of mounting post 37 having a concave surface portion formed on its outer face to accommodate a portion of the cylindrical surface of the shell 6 is used together with a clamp 38 and bolts 39 (Fig. 2) to rigidly secure electrode carrier 5 in known types of welders. The post 37 is provided with threaded recesses 37ᵃ and 37ᵇ to accommodate the bolts 39 as will be later more fully explained.

Figure 2:
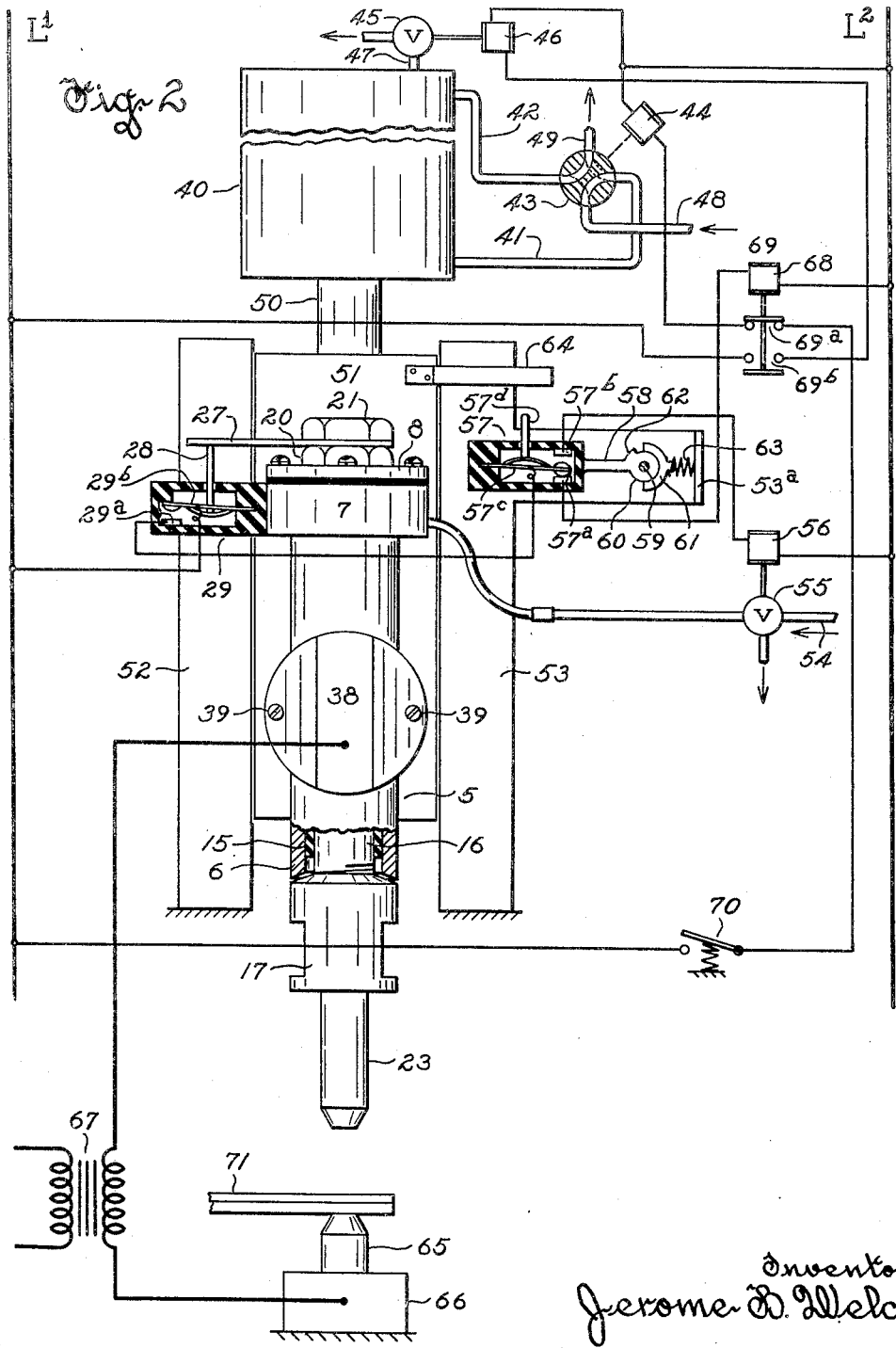
Fig. 2 shows more or less schematically a portion of a fluid powered welder together with the electrode carrier shown in Fig. 1, and a control system for said welder.

Referring to Fig. 2, it shows the aforedescribed electrode carrier 5 in its working relation to a known type of fluid powered welder together with a preferred type of control system for directing the operation of the welder.

More particularly said welder comprises a cylinder 40 having therein a plunger or piston (not shown), the movement of which toward its upper and lower extreme positions is effected by the application of air or other fluid under pressure to the lower and upper ends thereof through the conduits 41 and 42 respectively. The means for controlling the admission and release of air from said opposite ends of said piston comprise a known form of multi-way valve 43 having a solenoid type operating electromagnet 44, and an auxiliary exhaust valve 45 having a solenoid type operating electromagnet 46, interposed in an exhaust conduit 47 which connects interiorly with cylinder 40 above the upper side of said piston. In conformity with general practice, valve 43 is biased to the position shown when its operating electromagnet 44 is deenergized thereby affording connection of conduit 41 through said valve with an air supply conduit 48 and connection of the conduit 42 with an exhaust conduit 49. The exhaust valve 45 is closed when its operating electromagnet 46 is deenergized and is opened by energization of electromagnet 46. In the normal position of valve 43 the piston will be forced to its upper extreme position within cylinder 40 so that the parts associated with the piston as later described will be in the positions thereof as shown in Fig. 2.

A shaft 50 carried by and extending downwardly from the piston has rigidly attached thereto a member 51 which is adapted to move upwardly and downwardly, according to the movement of the piston, in a guide way formed by the stationary members 52 and 53. The mounting post 37, shown in Fig. 1, is rigidly secured to and projects perpendicularly outwardly from member 51. Carrier 5 is rigidly secured to post 37 in parallel relation with member 51 by the clamp 38 which is provided with openings therethrough which register with the recesses 37ᵃ and 37ᵇ of post 37 and by the bolts 39 which penetrate the openings in clamp 38 and take into said recesses in the post 37. Clamp 38 like post 37 is preferably provided with a concave surface portion on its inner face (not shown) to accommodate a portion of the surface of shell 6.

As will be noted, casing 33 and the parts associated therewith are omitted in the showing of Fig. 2 to simplify this figure, whereas said housing would be preferably used as aforedescribed in connection with Fig. 1.

An air supply conduit 54 is connected interiorly with member 7 of carrier 5 as by threaded engagement within the opening 11, and said conduit has interposed therein an air supply and exhaust valve 55 having a solenoid type operating electromagnet 56. When the electromagnet 56 is deenergized valve 55 is so positioned that air is exhausted from the aforedescribed diaphragm chamber in electrode carrier 5, and when said operating electromagnet is energized, valve 55 is so positioned that air under pressure is supplied to said diaphragm chamber.

An electric switch 57, which in one preferred form is a sensitive snap action switch of the so called "Micro" type, is provided with opposed stationary contacts 57$^a$ and 57$^b$, a movable contact 57$^c$ which normally engages contact 57$^a$, and an actuator 57$^d$, which when moved inwardly of the switch effects, with snap action, disengagement of contact 57$^c$ from contact 57$^a$ and engagement of contact 57$^c$ with contact 57$^b$. Switch 57 is preferably supported on a member 58 which is pivotally supported on member 53 at 59. The pivotal portion of member 58 is provided with an enlargement having an arcuate edge portion 60 against which a friction-clutch member 61 is adapted to bear, said enlargement of member 58 having a shoulder 62 formed at the upper end of arcuate edge 60 for cooperation with member 61 to limit manual upward movement of said member 58 and the switch 57. A coiled compression spring 63 is interposed between a suitable abutment 53$^a$ formed on member 53 and the member 61 to provide for frictional retention of member 58 in any position corresponding to the position to which switch 57 may be moved as will hereinafter be more fully explained. It is required that the frictional retention afforded member 58 by member 61 be such that the force needed to move member 58 against such retention be greater than the force needed to move the actuator 57$^d$ of switch 57 for actuation of the latter.

It will be noted that the preferred mounting of switch 57 above described is like that shown for contact apparatus in the aforementioned patent.

An operating arm 64 which is rigidly secured to and projects transversely of member 51 is adapted upon downward movement of the latter to move actuator 57$^d$ inwardly of switch 57 for actuation of the same, and also on an initial "setting" operation of the welder, which will be later more fully explained, is adapted to move the switch 57, bodily, to a certain position with respect to member 53 according to the thickness of the work to be welded.

Switch 29, aforementioned in connection with Fig. 1, and which in one preferred form is also of the sensitive snap action type, is provided with a stationary contact 29$^a$ which is normally engaged by a movable contact 29$^b$. When its actuator 28 is moved inwardly of said switch under the pressure of arm 27, as aforedescribed in connection with Fig. 1, movable contact 29$^b$ is disengaged from contact 29$^a$ and when actuator 28 is released for movement to its normal extended position with respect to switch 29, contact 29$^a$ is adapted to be engaged by contact 29$^b$.

A welding electrode 65 is secured within a stationary holder 66 in opposed alignment with the electrode 23. Shell 6 of carrier 5 is electrically connected to one end of a secondary winding of a welding transformer 67 through post 37 and holder 66 is connected to the other end of said secondary winding.

The contact 29$^b$ of switch 29 is connected to supply line L$^1$ and its contact 29$^a$ is connected with the contact 57$^c$ of switch 57. Contact 57$^a$ of switch 57 is connected to supply line L$^2$ through operating winding 68 of a relay 69, and contact 57$^b$ of said switch is connected to supply line L$^2$ through winding 56 of valve 55. A normally open switch 70, which in practice is preferably of the foot-operated type, connects across lines L$^1$ and L$^2$ in series with normally engaged contacts 69$^a$ of relay 69 and the operating winding 44 of valve 43. Normally disengaged contacts 69$^b$ of relay 69 when engaged connects across supply line L$^1$ and L$^2$ the winding 46 of auxiliary exhaust valve 45.

The operation of the welder will now be described.

It will be assumed that the welder is to handle pieces of work, such as the work 71, which work is of a different thickness than work previously handled by the welder. The switch 57 should be first manually moved, bodily, to its upper extreme position with respect to the normal position of the operating arm 64. As will be later apparent, such initial positioning of switch 57 insures that the same will be automatically positioned correctly on the first operation of the welder in relation to the thickness of work 71.

Operation of the welder is initiated by closure of the switch 70. Winding 44 of valve 43 is thereby energized and the latter assumes an operating position such that air under pressure will flow from conduit 48 through valve 43, conduit 42 into cylinder 40 on the upper side of the piston, and air in the cylinder below the piston will be exhausted through conduit 41, valve 43 and conduit 49. As a result, the member 51 and the parts associated therewith move downwardly toward the work 71. Member 64 in moving downwardly engages the actuator 57$^d$ of switch 57 and on continued downward movement moves said actuator inwardly of the switch to its limit and thereafter effects movement of switch 57, bodily, pivotally downwardly through movement of member 58 with respect to the friction-clutch member 61. Ultimately the tip of electrode 23 engages with the work 71 and as an incident thereto shaft 16 and arm 27 move upwardly relative to the housing of electrode carrier 5 with lost motion. Actuator 28 of switch 29 is thereby released for movement outwardly of the switch and engagement of contact 29$^b$ with contact 29$^a$ is thereby effected. A circuit is thereby established from supply line L$^1$ through contacts 29$^a$ and 29$^b$ of switch 29, contacts 57$^c$ and 57$^b$ of switch 57, winding 56 of valve 55 to supply line L$^2$. Valve 55 is thereby operated to the position aforedescribed where air is supplied under pressure to the diaphragm chamber in electrode carrier 5. Thereupon, shaft 16 moves rapidly upwardly within its housing under pneumatic pressure and the electrode holder 17 and shell 6 are thus brought into abutting engagement at their adjacent frustoconical surfaces to afford positive electrical connection of one to the other. Such electrical connection of holder 17 and shell 6 effects completion of a welding circuit from one side of the secondary winding of transformer 67 through post 37, shell 6, holder 17, electrode 23, work 71, electrode 65, holder 66, back to the other side of the secondary winding of welding transformer 67.

Although not forming a part of the present invention, it is usual to provide a normally open switch responsive to the development of a predetermined degree of pressure of the electrodes 23 and 65 against the work to effect closure of such switch for energizing the primary winding of the welding transformer 67.

As will be understood by those skilled in the art a certain degree of collapsing of the metal of work 71 beneath the electrode 23 will occur as an incident to the welding of the work. Such collapse of the metal will cause member 51 and parts associated therewith to move downwardly to the extent of the collapse. Thus switch 57 will be moved, bodily, downwardly a corresponding amount after attaining an initial set position as determined by the position of member 51 following reengagement of electrode 23 with the work after positive electrical connection of hold 17 and shell 6 has been effected as aforedescribed.

After completion of the welding of work 71, the return of the welder to its normal operating position is effected by release of switch 70. Release of switch 70 causes winding 44 of valve 43 to be deenergized and the latter will assume its normal operating position and air under pressure will be admitted to cylinder 40 on the lower side of the piston and air will be exhausted from the cylinder on the upper side of the piston. Consequently member 51 and the parts associated therewith move upwardly and away from work 71 to assume their respective normal positions. The first operation of the welder aforedescribed constitutes a "setting" operation which must be carried out whenever pieces of work, thicker than that which the welder previously handled, are thereafter to be handled by the welder. If the pieces of work to be handled are thinner, then it is not required that switch 57 be first manually moved, bodily, to its upper limit as aforedescribed, as said switch in such event will be moved further downwardly from the set position previously attained.

During subsequent operations of the welder, under normal conditions, the control system will function as aforedescribed in connection with the "setting" operation, provided the work handled during such operations is of the same thickness as the work 71. However, it will be noted that on such subsequent operation there will be no movement, bodily, of switch 57 from the position attained by the "setting" operation of the welder if the collapse of the metal of the work is not greater than that obtaining on the welding of work 71 during the "setting" operation. Further, switch 57 will not be actuated until the electrode 23 closely approaches the work on such subsequent operations. The clearance distance between the work and electrode 23 obtaining at the time switch 57 is actuated, is that distance the actuator 57$^d$ travels from its normal position to the position attained thereby when switch 57 is actuated minus the depth of metal collapse obtaining on work 71 as an incident to the welding thereof during the "setting" operation of the welder.

As will now be described, the control system is so adjusted by the "setting" operation of the welder, that on subsequent operations of the welder it inherently functions in a manner to prevent injury to the operator. Assume that during such a subsequent operation, when electrode 23 is moving downwardly toward the work, the operator negligently places his hand over the work in line with electrode 23. When the tip of electrode 23 comes into contact with the operator's hand, the aforedescribed upward lost motion movement of shaft 16 and lever 27 with respect to the housing of carrier 5 occurs and such movement takes place before the arm 64 can effect actuation of switch 57. As a result contacts 29$^a$ and 29$^b$ of switch 29 engage while switch 57 remains in the condition shown in Fig. 2. Thus a circuit is established from supply line L$^1$ through contacts 29$^b$ and 29$^a$ of switch 29, contacts 57$^c$ and 57$^a$ of switch 57, operating winding 68 of relay 69 to supply line L$^2$. Relay 69 thereby assumes an operating condition such that its contacts 69$^a$ are disengaged and its contacts 69$^b$ are engaged. As a result, winding 44 of valve 43 is deenergized and winding 46 of the auxiliary exhaust valve 45 is energized. Consequently air is rapidly exhausted from cylinder 40 on the upper side of the piston while air is admitted to cylinder 40 on the lower side of the piston to effect substantially instantaneous movement of the piston and parts associated therewith in the upward direction. Thus electrode 23 is moved upwardly and away from the hand of the operator before any appreciable pressure is exerted thereon thereby preventing injury to the operator.

In practice, the aforedescribed "setting" operation of the welder should be effected by the operator or by a supervisor with extreme care to insure against injury to the hands or fingers inasmuch as the control system will not function to prevent injury on such "setting" operations. However, the switch 57 may be pre-adjusted manually in accordance with the thickness of the work to be handled without resorting to a "setting" operation of the welder, in which case the control system will inherently afford such safety function on initial operation of the welder thereafter. If the latter method of manually pre-adjusted switch 57 is preferred, a suitable scale and pointer arrangement of legends might be provided on adjacent parts of member 58 and clutch 61 respectively to facilitate such adjustment.

It will be apparent that electrical connection of shell 6 and electrode holder 17 might be effected entirely as a result of the aforedescribed upward lost motion movement of shaft 16 with respect to the housing of electrode carrier 5. However, it is preferred that electrical connection of shell 6 with holder 17 be effected by pneumatic or fluid power to insure that such connection will be positively maintained during the welding of work pieces. Without positive maintenance of such electrical connection it is likely that a separation between shell 6 and holder 17 will occur as an incident to the collapse of metal on the work beneath electrode 23. As will be understood, severe arcing may attend such a separation and damage necessitating the replacement of shell 6 and holder 17 may result.

Auxiliary exhaust valve 45 and the parts associated therewith, including the contacts 69$^a$ of relay 69, may be omitted as desired if valve 43 is of such character that it will provide for exhaustion of air or other fluid at a rapid rate. The use of auxiliary valve 45 insures that there will be rapid exhaustion of air or fluid from the upper side of the piston when a foreign object is encountered by electrode 23 in moving downwardly toward the work.

What I claim as new and desire to secure by Letters Patent is:

1. In a powered electric welder, in combination, an electrode carrier comprising first and second parts having a straight line lost motion connection therebetween and being normally in extended relation, relatively movable electrodes one of which is carried by said first part of said carrier to be moved toward the other electrode by movement of said carrier as a whole in a direction to take up lost motion between said carrier parts, a normally interrupted electrical connection for the electrode of said carrier including control contacts engageable by take-up of the lost motion between said carrier parts, power responsive means to move said carrier as a whole in reverse directions, power responsive means to take up the lost motion between said carrier parts, and control means for said two power responsive means including means responsive to relative movement of said carrier parts resulting from the carrier electrode being arrested before it contacts the work between the electrodes, to effect powered movement of said carrier in a direction to separate the electrodes, and further including means responsive to carrier movement engaging the carrier electrode with the work, to effect powered take-up of lost motion between said carrier parts to engage said contacts in the electrical connection for the carrier electrode.

2. In a powered electric welder, in combination, an electrode carrier comprising first and second parts having a straight line lost motion connection therebetween and being normally in extended relation, relatively movable electrodes one of which is carried by said first part of said carrier to be moved toward the other electrode by movement of said carrier as a whole in a direction to take up lost motion between said carrier parts, power responsive means to move said carrier as a whole in reverse directions, power responsive means to take up the lost motion between said carrier parts, and control means for said two power responsive means including means responsive to relative movement of said carrier parts resulting from arrest of the carrier electrode before it contacts the work between the electrodes, to effect powered movement of said carrier in a direction to separate the electrodes and further including means responsive to carrier movement causing the carrier electrode to contact with the work, to effect powered take-up of the lost motion between said carrier parts.

3. In a powered electric welder, in combination, an electrode carrier comprising first and second parts having a straight line lost motion connection therebetween and being normally in extended relation, relatively movable electrodes one of which is carried by said first part of said carrier to be moved toward the other electrode by movement of said carrier as a whole in a direction to take up lost motion between said carrier parts, cooperating contacts controlling an electrical connection for the electrode of said carrier which normally are disengaged and engageable by take-up of the lost motion between said carrier parts, power responsive means to move said carrier as a whole in reverse directions, and control means for said power responsive means including means responsive to relative movement of said carrier parts resulting from arrest of the carrier electrode before it contacts the work between the electrodes, to effect powered movement of said carrier in a direction to separate the electrodes.

4. In a powered electric welder, in combination, an electrode carrier comprising first and second parts having a straight line lost motion connection therebetween and being normally in extended relation, relatively movable electrodes one of which is carried by said first part of said carrier to be moved toward the other electrode by movement of said carrier as a whole in a direction to take up lost motion between said carrier parts, an electrical connection for said carrier electrode controlled by the relation of said carrier parts, power responsive means to move said carrier as a whole in reverse directions, power responsive means to take up the lost motion between said carrier parts and control means for said two power responsive means including in association with said carrier parts cooperating electric switches which as a function of relative movement of said carrier parts resulting from arrest of the carrier electrode before it contacts the work between the electrodes, to effect powered movement of said carrier in a direction to separate the electrodes and which as a function of carrier movement causing the carrier electrode to contact the work effects powered take-up of the lost motion between said carrier parts for control of said connection for the carrier electrode.

5. In a powered electric welder, in combination, an electrode carrier comprising first and second parts having a straight line lost motion connection therebetween and being normally in extended relation, relatively movable electrodes one of which is carried by said first part of said carrier to be moved toward the other electrode by movement of said carrier as a whole in a direction to take up lost motion between said carrier parts, an electrical connection for the carrier electrode controlled by the relation of said carrier parts, power responsive means to move said carrier as a whole in reverse directions, power responsive means to take up the lost motion between said carrier parts, and control means for said two power responsive means acting upon relative movement of said carrier parts resulting from arrest of the carrier electrode before it contacts the work between the electrodes, to effect powered movement of said carrier in a direction to separate the electrodes and acting upon arrest of the carrier electrode by contact with the work to effect powered movement of said carrier parts relatively for control of said electrode connection, said control means for causing it to so function comprising cooperating electric switches one of which is operable as an incident to relative movement of said carrier parts and another of which is operable as a function of a predetermined distance travel of said carrier as a whole from its normal position.

6. In a powered electric welder, in combination, an electrode carrier comprising first and second parts having a straight line lost motion connection therebetween and being normally in extended relation, relatively movable electrodes one of which is carried by said first part of said carrier to be moved toward the other electrode by movement of said carrier as a whole in a direction to take up lost motion between said carrier parts, power responsive means to move said carrier as a whole in reverse directions, power responsive means to take up the lost motion between said parts of said carrier, and control means for said two power responsive means acting upon relative movement of said carrier parts resulting from arrest of the carrier electrode before it contacts the work between the electrodes, to effect movement of said carrier in a direction to separate the electrodes and acting upon arrest of the carrier electrode by contact with the work to take up the lost motion between said carrier parts, said control means for causing it to so function comprising in series relation a single throw electric switch and a double throw electric switch, said switch first mentioned being operable as an incident to relative movement between said parts of said carrier and said last mentioned switch being operable as an incident to a predetermined distance travel of said carrier as a whole from its normal position.

7. In a powered electric welder, in combination, an electrode carrier comprising first and second parts having a straight line lost motion connection therebetween and being normally in extended relation, relatively movable electrodes one of which is carried by said first part of said carrier to be moved toward the other electrode by movement of said carrier as a whole in a direction to take up lost motion between said carrier parts, power responsive means to move said carrier as a whole in reverse directions, power responsive means to take up the lost motion between said parts of said carrier, and control means for said two power responsive means comprising in series relation a single throw electric switch and a double throw electric switch, said first mentioned switch being operable to complete a circuit as an incident to lost motion take-up between said parts of said carrier and said last mentioned switch being normally positioned to complete a circuit such that circuit closing operation of said first mentioned switch will cause said control means to effect powered movement of said carrier in a direction to separate the electrodes and said second mentioned switch being operable as an incident to a predetermined distance travel of said carrier as a whole from a given starting position toward welding position to complete an alternative circuit such that circuit closing operation of the first mentioned switch will cause said control means to effect powered movement of said carrier parts relatively to insure and maintain take-up of the lost motion between said parts for welding.

8. In a powered electric welder, in combination, an electrode carrier comprising first and second parts having a straight line lost motion connection therebetween and being normally in extended relation, relatively movable electrodes one of which is carried by said first part of said carrier to be moved toward the other electrode by movement of said carrier as a whole in a direction to take up lost motion between said carrier parts, power responsive means to move said carrier as a whole in reverse directions, power responsive means to take up the lost motion between said carrier parts, cooperating contact elements controlling a connection to the electrode of said carrier which normally are disengaged and engageable upon take-up of the lost motion between said carrier parts, and control means for said two power responsive means comprising electroresponsive means which when energized connects said second mentioned power responsive means to a source of power, a single throw electric switch and a double throw electric switch in series with said first mentioned switch, said first mentioned switch being operable as an incident to lost motion take-up between said carrier parts and said last mentioned switch being normally positioned to complete a circuit such that circuit closing operation of said first mentioned switch will cause said control means to effect powered movement of said carrier in a direction to separate the electrodes, and said last mentioned switch being operable as an incident to a predetermined distance travel of said carrier as a whole from a given starting position toward welding position to complete another circuit such that upon circuit closing operation of said first mentioned switch said electroresponsive power control means will be energized to effect powered movement of said carrier parts relatively to insure and maintain engagement of said contact elements for welding.

9. In a fluid powered electric welder, in combination, an electrode carrier comprising first and second parts having a straight line lost motion connection therebetween and being normally in extended relation, relatively movable electrodes one of which is carried by said first part of said carrier to be moved toward the other electrode by movement of said carrier as a whole in a direction to take up lost motion connection, fluid power responsive means subject to manual control to move said carrier in reverse directions selectively at will, fluid power responsive means to take up the lost motion between said carrier parts, cooperating contacts associated with said carrier parts for controlling a connection of the electrode of said carrier which contacts are normally disengaged and engageable upon take-up of the lost motion between said carrier parts, an electroresponsive relay which when energized effects powered movement of said carrier as a whole to separate said electrodes, electroresponsive control means which when energized connects said second mentioned fluid power responsive means to a source of fluid power thereby to insure and maintain engagement of said contacts for welding, a single throw electric switch supported by said second part of said carrier and bodily movable therewith and a double throw electric switch connected in series with said first mentioned switch and having a fixed but adjustable support, said first mentioned switch being operable to complete a circuit as an incident to lost motion take-up between said parts of said carrier, and said last mentioned switch being normally positioned to complete a circuit such that circuit closing operation of said first mentioned switch will effect energization of said relay and being operable as an incident to a predetermined distance travel of said carrier as a whole from a given starting position toward welding position to complete an alternative circuit such that circuit closing operation of said first mentioned switch will effect energization of said electroresponsive control means.

10. An electrode carrier comprising, first and second parts having a straight line lost motion connection therebetween, an electrode carried by said first part and movable by said carrier to and away from its work, cooperating contact elements associated with said carrier parts for control of a circuit connection for said electrode, said contacts being disengaged with said carrier parts in extended relation and engageable by take-up of the lost motion between said carrier parts, and power actuated means to insure and maintain take-up of the lost motion between said carrier parts for welding.

11. An electrode carrier, comprising a housing, a shaft, insulating bearing supports carried by said housing providing sliding support for said shaft within said housing and insulating said shaft and said housing from each other, said shaft being movable rectilinearly between opposite extreme positions with respect to said housing, an electrode holder secured to said shaft and located exteriorly of said housing, an electrode secured to said holder and movable by said carrier to and from the work, said holder and said housing being provided with oppositely disposed cooperating contact elements for control of a circuit connection therebetween, said contact elements being engaged in one of said extreme positions of said shaft and being disengageable upon movement of the latter toward the other extreme position.

JEROME B. WELCH.

REFERENCES CITED

The following references are of record in the file of this patent:

UNITED STATES PATENTS

| Number | Name | Date |
|---|---|---|
| Re. 13,530 | Warren | Feb. 11, 1913 |
| 1,684,296 | Brodsky | Sept. 11, 1928 |
| 2,151,342 | Von Henke | Mar. 21, 1939 |
| 2,283,996 | Irwin et al. | May 26, 1942 |
| 2,294,388 | Dawson | Sept. 1, 1942 |
| 2,426,280 | Nichols | Aug. 26, 1947 |

FOREIGN PATENTS

| Number | Country | Date |
|---|---|---|
| 413,664 | Great Britain | July 18, 1934 |
| 336,825 | Germany | Mar. 30, 1922 |